(12) United States Patent
Colvin et al.

(10) Patent No.: US 11,071,284 B2
(45) Date of Patent: Jul. 27, 2021

(54) MANUAL REEL RETRACTABLE LEASH APPARATUS

(71) Applicants: Earl Colvin, St Louis, MO (US); Shelly Colvin, St Louis, MO (US)

(72) Inventors: Earl Colvin, St Louis, MO (US); Shelly Colvin, St Louis, MO (US)

(*) Notice: Subject to any disclaimer, the term of this patent is extended or adjusted under 35 U.S.C. 154(b) by 0 days.

(21) Appl. No.: 16/710,594

(22) Filed: Dec. 11, 2019

(65) Prior Publication Data
US 2021/0176967 A1 Jun. 17, 2021

(51) Int. Cl.
*A01K 27/00* (2006.01)
*B65H 75/44* (2006.01)

(52) U.S. Cl.
CPC ........ *A01K 27/004* (2013.01); *B65H 75/4428* (2013.01)

(58) Field of Classification Search
CPC ........... Y10T 83/6534; Y10T 74/20744; Y10T 74/20642; G05G 1/44; H01R 13/62961; A01K 27/004; B65H 75/4228; B65H 75/4431; B65H 75/4465; B65H 75/4492; B65H 75/406
See application file for complete search history.

(56) References Cited

U.S. PATENT DOCUMENTS

| | | | |
|---|---|---|---|
| 3,853,283 A * | 12/1974 | Croce | F16D 41/16 242/381.6 |
| 6,626,391 B2 * | 9/2003 | Kretsch | A01K 3/00 242/395.1 |
| 6,886,499 B2 | 5/2005 | Meissner | |
| 7,762,215 B2 | 7/2010 | Horton | |
| 9,339,014 B1 | 5/2016 | Wettermann | |
| 9,480,241 B2 | 11/2016 | Holmstrom | |
| 2007/0022975 A1 | 2/2007 | Arnold | |
| 2009/0145993 A1 * | 6/2009 | Ni | B65H 75/4492 242/395.1 |
| 2009/0217886 A1 * | 9/2009 | Lopusnak | A01K 27/004 119/796 |
| 2010/0326371 A1 * | 12/2010 | Lopusnak | A01K 27/004 119/796 |
| 2012/0079994 A1 * | 4/2012 | Chefetz | A01K 27/004 119/796 |
| 2013/0008392 A1 * | 1/2013 | Holmstrom | B25G 1/06 119/796 |
| 2013/0312331 A1 * | 11/2013 | Bourgoin | E05F 11/10 49/359 |
| 2015/0237832 A1 * | 8/2015 | O'Brien | A01K 27/004 119/796 |
| 2016/0143253 A1 * | 5/2016 | Pawlowski | A01K 27/004 119/796 |
| 2016/0338323 A1 * | 11/2016 | Nishida | A01K 27/004 |
| 2018/0206454 A1 * | 7/2018 | Brown | A01K 27/004 |

* cited by examiner

*Primary Examiner* — Joshua D Huson
*Assistant Examiner* — Megan J Moroney

(57) ABSTRACT

A manual reel retractable leash apparatus for manually retracting a leash to control a dog includes a retractable leash spool coupled within a leash body. A leash is windingly coupled around the leash spool and extends through a leash aperture of the leash body. A crank housing is coupled to the leash body and a drive mechanism is coupled within crank housing. The drive mechanism is in operational communication with the leash spool and an outer face of the crank housing. A crank handle is coupled to the outer face to provide a place for a user to rotate the crank housing to power the drive mechanism and retract the leash.

9 Claims, 5 Drawing Sheets

MANUAL REEL RETRACTABLE LEASH APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to retractable leashes and more particularly pertains to a new retractable leash for manually retracting a leash to control a dog.

BRIEF SUMMARY OF THE INVENTION

An embodiment of the disclosure meets the needs presented above by generally comprising a leash body having a body left side separated from a body right side, a body top edge, a body bottom edge, a body back edge, and a body front edge defining a body inside. A handle aperture extends from the body left side through the body right side to define a handle portion between the handle aperture and the body back edge and a leash portion between the handle aperture and the body front edge. A crank housing is coupled to the leash body and has an inner face coupled to the body right side, a sidewall extending away from the inner face, and an outer face rotatably coupled to the sidewall and defining a crank cavity. A leash spool is coupled to the leash body. The leash spool is coupled within the body inside of the leash portion. The leash spool has a center axle, a coil spring coupled around the center axle, and a spool body coupled to the coil spring. The center axle extends through the body right side and the inner face into the crank cavity. A leash is coupled to the leash spool. The leash is windingly coupled around the spool body with a distal end extending through a leash aperture of the body top edge. The leash has a clasp coupled to the distal end. A drive mechanism is coupled to the crank housing. The drive mechanism is coupled to the outer face within the crank cavity and is in operational communication with the center axle. A crank handle is coupled to the crank housing. The crank handle is coupled to the outer face to provide a place for a user to rotate the outer face to power the drive mechanism, rotate the center axle, and retract the leash.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
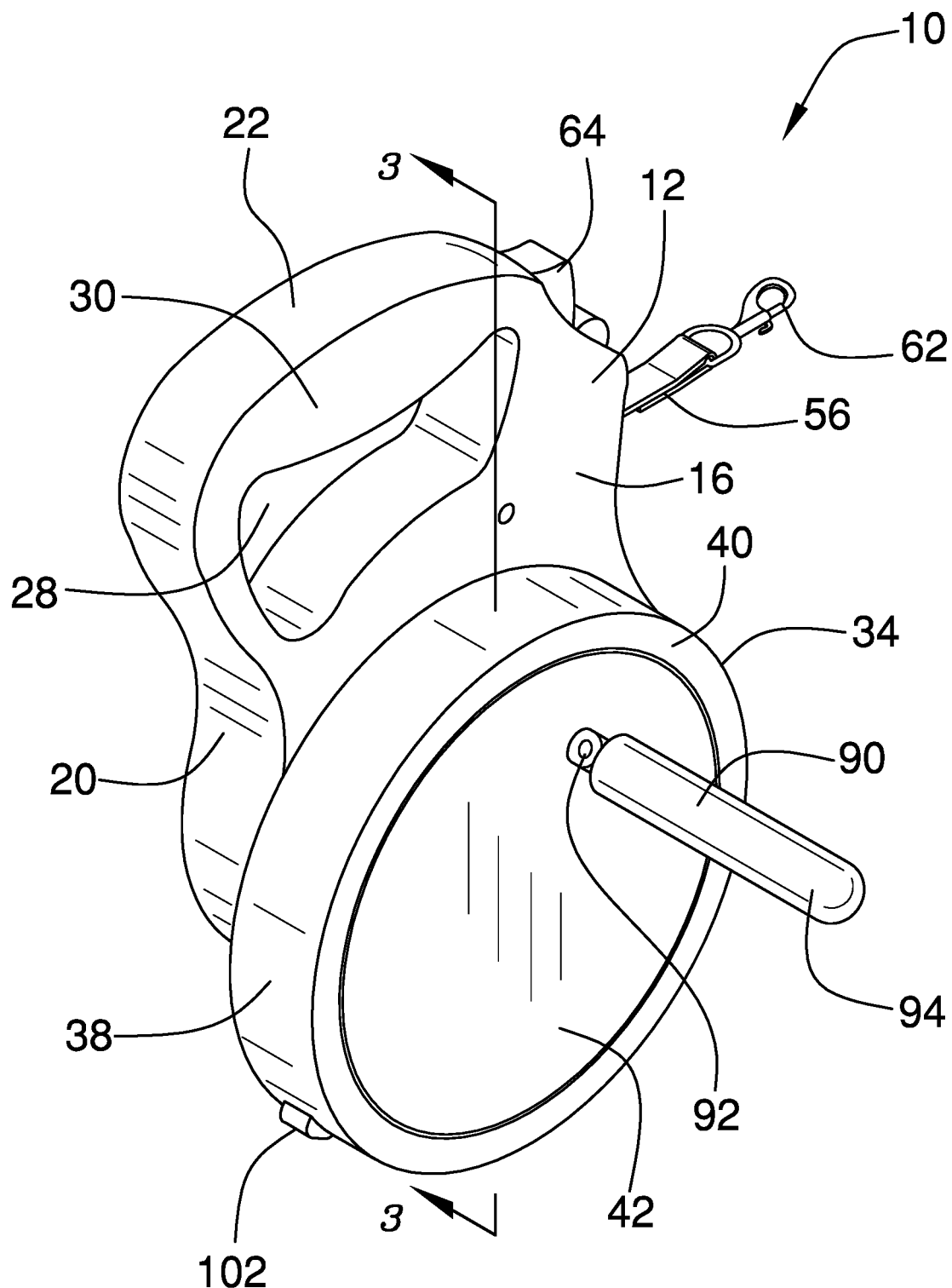
FIG. 1 is an isometric view of a manual reel retractable leash apparatus according to an embodiment of the disclosure.
Figure 2:
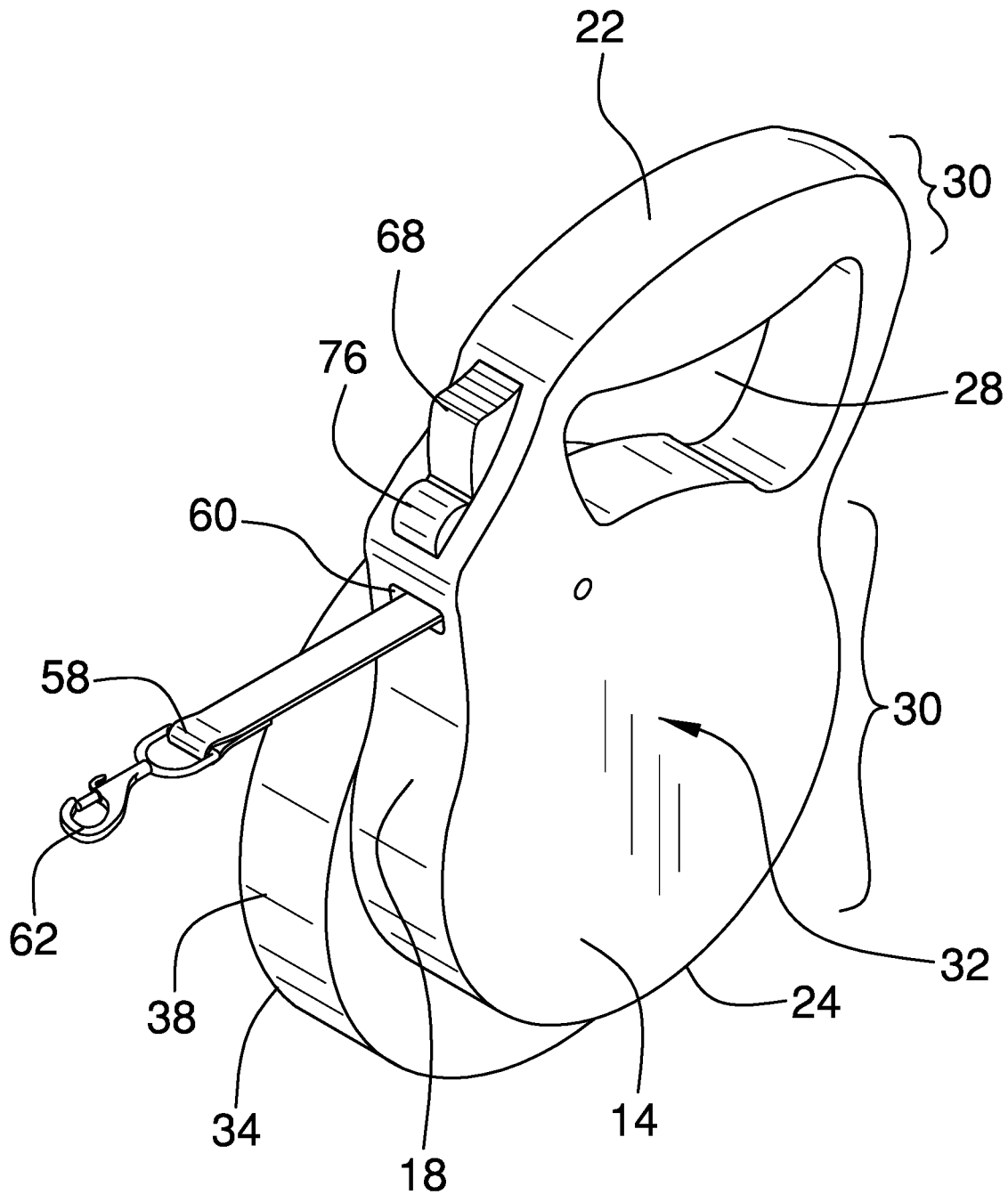
FIG. 2 is an isometric view of an embodiment of the disclosure.
Figure 3:
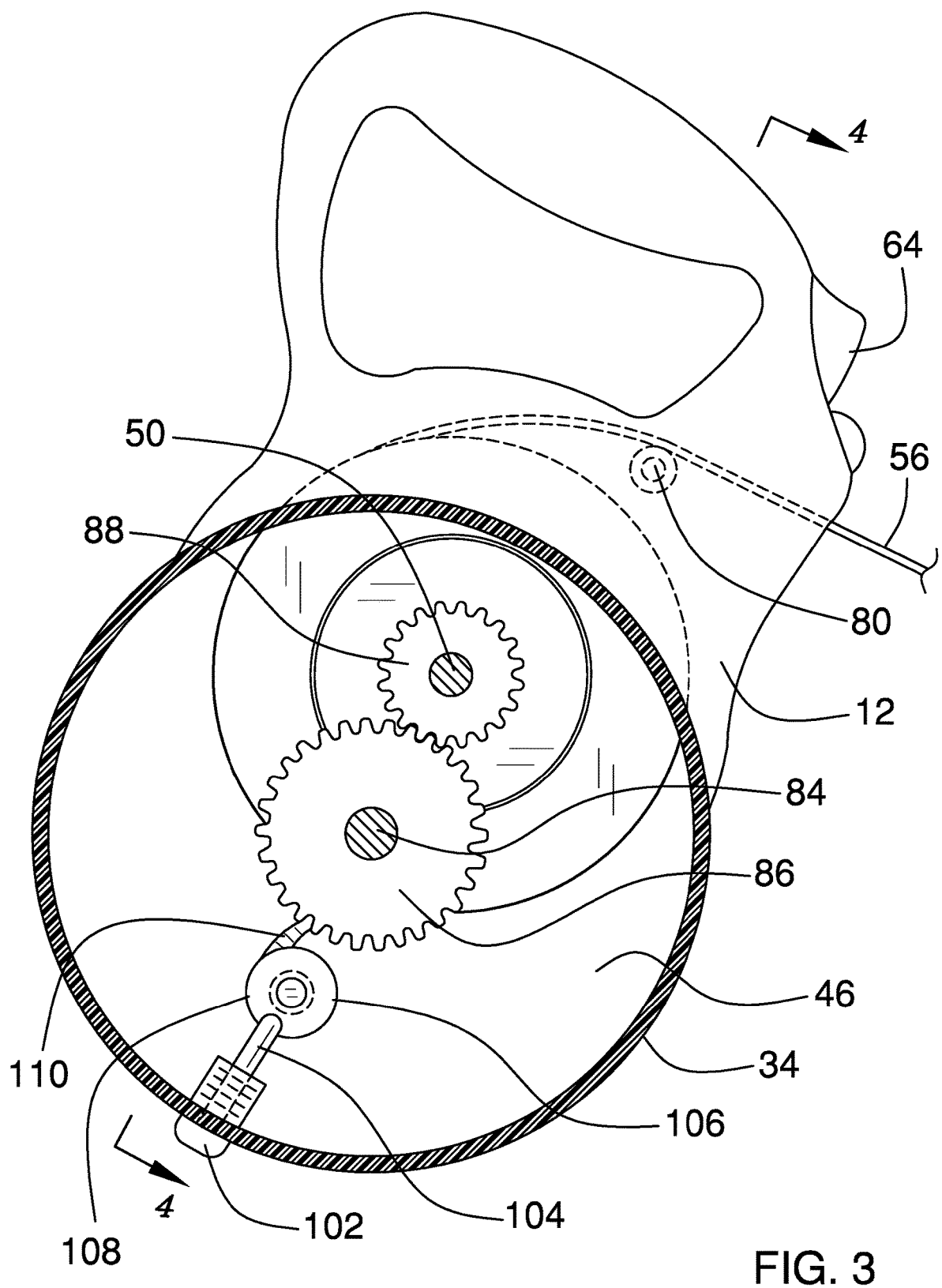
FIG. 3 is a cross-sectional view along the line 3-3 of FIG. 1 of an embodiment of the disclosure.
Figure 4:
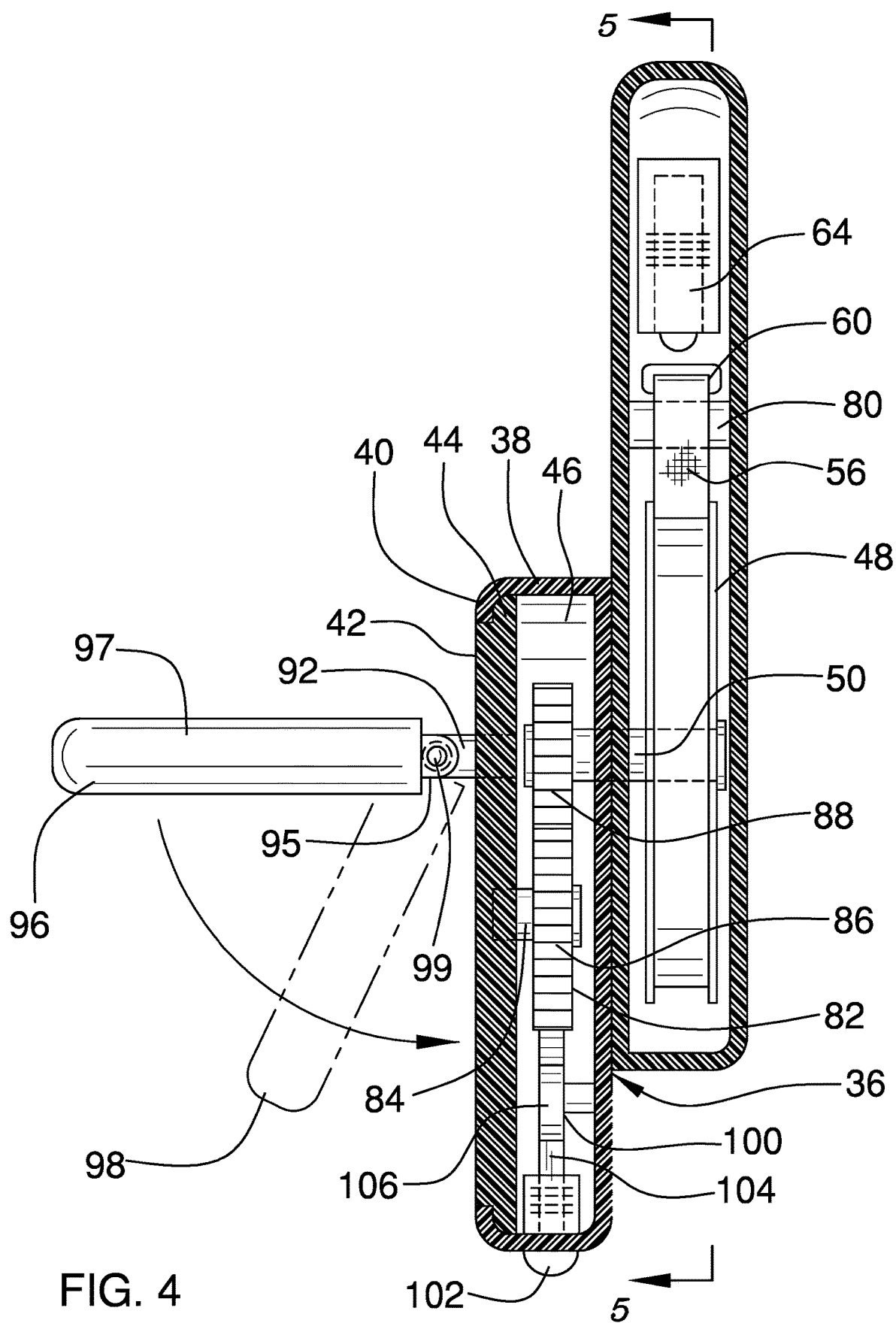
FIG. 4 is a cross-sectional view along the line 4-4 of FIG. 3 of an embodiment of the disclosure.
Figure 5:
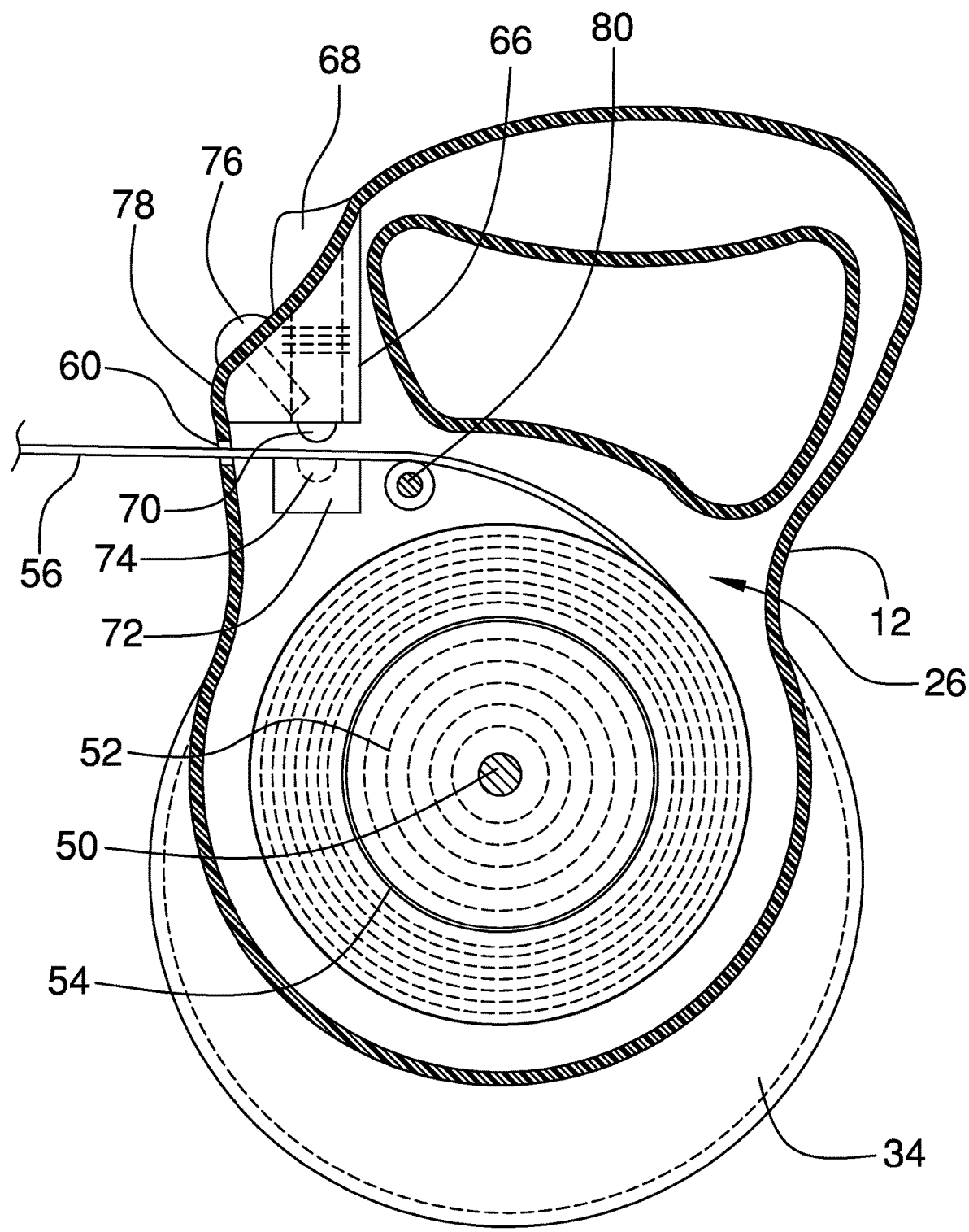
FIG. 5 is a cross-sectional view along the line 5-5 of FIG. 4 of an embodiment of the disclosure.

With reference now to the drawings, and in particular to FIGS. 1 through 5 thereof, a new retractable leash embodying the principles and concepts of an embodiment of the disclosure and generally designated by the reference numeral 10 will be described.

As best illustrated in FIGS. 1 through 5, the manual reel retractable leash apparatus 10 generally comprises a leash body 12 having a body left side 14 separated from a body right side 16, a body top edge 18, a body bottom edge 20, a body back edge 22, and a body front edge 24 defining a body inside 26. A handle aperture 28 extends from the body left side 14 through the body right side 16 to define a handle portion 30 between the handle aperture 28 and the body back edge 22 and a circular leash portion 32 between the handle aperture 28 and the body front edge 24. A crank housing 34 is coupled to the leash body 12. The crank housing 34 has an inner face 36 coupled to the body right side 16. A sidewall 38 extends away from the inner face 36 and the sidewall 38 has a curved rim 40. An outer face 42 has an outer lip 44 rotatingly coupled within the curved rim 40 defining a crank cavity 46. The crank housing 34 is circular and a diameter of the crank housing 34 is greater than a diameter of the leash portion 32. A leash spool 48 is coupled within the body inside 26 of the leash portion 32. The leash spool 48 has a center axle 50, a coil spring 52 coupled around the center axle 50, and a spool body 54 coupled to the coil spring 52. The center axle 50 extends through the body right side 16 and the inner face 36 into the crank cavity 46. A leash 56 is windingly coupled around the spool body 54 with a distal end 58 extending through a leash aperture 60 of the body top edge 18. The leash 56 has a clasp 62 coupled to the distal end 58.

A leash lock 64 is coupled through the body top edge 18 proximal the body back edge 22. The leash lock 64 is in operational communication with the leash 56 to prevent and alternatively allow retraction through the leash aperture 60. The leash lock 64 comprises a leash lock housing 66 coupled to the leash body 12 within the body inside 26. A spring-loaded lock button 68 extends through the body top edge 18 and has a leash pin 70 extending through the leash lock housing 66. A leash catch 72 is coupled to the leash body 12 within the body inside 26 and is arranged such that the leash 56 passes between the leash pin 70 and the leash catch 72. The leash catch 72 has a depression 74 to selectively receive the leash pin 70 to cinch the leash 56 against the leash catch 72. A retainer button 76 is coupled adjacent the lock button 68 and has a retainer pin 78 extending at an angle within the leash lock housing 66 to selectively engage the leash pin 70. The retainer pin 78 locks and alternatively releases the retainer pin 78. A guide pin 80 is coupled within the body inside 26 adjacent the leash catch 72. A drive mechanism 82 is coupled to the outer face 42 within the crank cavity 46. The drive mechanism 82 comprises a central hub 84 coupled to the outer face 42 within the crank cavity 46, a drive gear 86 coupled to the central hub 84, and a driven gear 88 coupled to the center axle 50. The driven gear 88 is in operational communication with the drive gear 86. A crank handle 90 is coupled to the outer face 42 to provide a place for a user to rotate the outer face 42 to power the drive mechanism 82, rotate the center axle 50, and retract the leash 56. The crank handle 90 has a pivot portion 92 and a handle portion 94. The pivot portion 92 extends perpendicularly from the outer face 42 of the crank housing 34 and the handle portion 94 is pivotably coupled to the pivot portion 92 to move between an extended position 96 perpendicular to the outer face 42 and an alternative folded position 98 adjacent the outer face 42. The handle portion 94 has a tongue 95 pivotably coupled to the pivot portion 92 and a rotatable grip 97 coupled to the tongue 95. The tongue 95 has a crank handle lock button 99 to selectively engage and disengage the pivot portion 92.

A gear lock 100 is coupled to the crank housing 34. The gear lock 100 comprises a spring-loaded gear release button 102 extending through the sidewall 38 to the crank cavity 46. The gear release button 102 has a gear pin 104 and the gear pin 104 is selectively engageable with a spring-loaded lock paddle 106. The lock paddle 106 has a paddle hub 108 and a curved paddle arm 110 extending from the paddle hub 108. The paddle arm 110 is in operational communication with the drive gear 86 to selectively allow movement in only one direction. The gear release button 102 engages and alternatively disengages the lock paddle 106 with the drive gear 86.

In use, the clasp 62 is attached to a pet's collar. The lock button 68 is used to temporarily cinch the leash 56 and prevent automatic retraction. The retainer button 76 may be used to keep the leash 56 cinched without depressing the lock button 68. To force retraction and bring the pet closer the handle portion 94 is moved to the extended position 96 and the gear release button 102 is depressed to rotate the outer face 42 and power the drive mechanism 82.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A manual reel retractable leash apparatus comprising:
   a leash body, the leash body having a body left side separated from a body right side, a body top edge, a body bottom edge, a body back edge, and a body front edge defining a body inside, a handle aperture extending from the body left side through the body right side to define a handle portion between the handle aperture and the body back edge and a leash portion between the handle aperture and the body front edge;
   a crank housing coupled to the leash body, the crank housing having an inner face coupled to the body right side, a sidewall extending away from the inner face, and an outer face rotatably coupled to the sidewall and defining a crank cavity;
   a leash spool coupled to the leash body, the leash spool being coupled within the body inside of the leash portion, the leash spool having a center axle, a coil spring coupled around the center axle, and a spool body coupled to the coil spring, the center axle extending through the body right side and the inner face into the crank cavity;
   a leash coupled to the leash spool, the leash being windingly coupled around the spool body with a distal end extending through a leash aperture of the body top edge, the leash having a clasp coupled to the distal end;
   a drive mechanism coupled to the crank housing, the drive mechanism being coupled to the outer face within the crank cavity and in operational communication with the center axle;
   a crank handle coupled to the crank housing, the crank handle being coupled to the outer face to provide a place for a user to rotate the outer face to power the drive mechanism, rotate the center axle, and retract the leash, the crank handle having a pivot portion and a handle portion, the pivot portion extending perpendicularly from the outer face of the crank housing and the handle portion being pivotably coupled to the pivot portion to move between an extended position perpendicular to the outer face and an alternative folded position adjacent the outer face;
   the handle portion having a tongue pivotably coupled to the pivot portion and a rotatable grip coupled to the tongue, the tongue having a crank handle lock button to selectively engage and disengage the pivot portion; and a gear lock coupled to the crank housing, the gear lock being coupled through the sidewall and being in operational communication with the drive mechanism to lock and alternatively release the drive mechanism.

2. The manual reel retractable leash apparatus of claim 1 further comprising the drive mechanism comprising a central hub coupled to the outer face within the crank cavity, a drive gear coupled to the central hub, and a driven gear coupled to the center axle, the driven gear being in operational communication with the drive gear.

3. The manual reel retractable leash apparatus of claim 2 further comprising a gear lock coupled to the crank housing, the gear lock comprising a spring-loaded gear release button extending through the sidewall to the crank cavity, the gear release button having a gear pin, the gear pin being selectively engageable with a spring-loaded lock paddle, the lock paddle having a paddle hub and a curved paddle arm extending from the paddle hub, the paddle arm being in operational communication with the drive gear to selectively allow movement in only one direction, the gear release button engaging and alternatively disengaging the lock paddle with the drive gear.

4. The manual reel retractable leash apparatus of claim 1 further comprising a leash lock coupled to the leash body, the leash lock being coupled through the body top edge proximal the body back edge, the leash lock being in operational communication with the leash to prevent and alternatively allow retraction through the leash aperture.

5. The manual reel retractable leash apparatus of claim 4 further comprising the leash lock comprising a leash lock housing coupled to the leash body within the body inside, a spring-loaded lock button extending through the body top edge and having a leash pin extending through the leash lock housing, a leash catch coupled to the leash body within the body inside and arranged such that the leash passes between the leash pin and the leash catch, the leash catch having a depression to selectively receive the leash pin to cinch the leash against the leash catch, a retainer button coupled adjacent the lock button and having a retainer pin extending at an angle within the leash lock housing to selectively engage the leash pin, the retainer pin locking and alternatively releasing the retainer pin.

6. The manual reel retractable leash apparatus of claim 5 further comprising a guide pin coupled to the leash body within the body inside adjacent the leash catch.

7. The manual reel retractable leash apparatus of claim 1 further comprising the leash portion being circular, the crank housing being circular, and a diameter of the crank housing being greater than a diameter of the leash portion.

8. The manual reel retractable leash apparatus of claim 1 further comprising the sidewall having a curved rim, the outer face having an outer lip rotatingly coupled within the curved rim.

9. A manual reel retractable leash apparatus comprising:

a leash body, the leash body having a body left side separated from a body right side, a body top edge, a body bottom edge, a body back edge, and a body front edge defining a body inside, a handle aperture extending from the body left side through the body right side to define a handle portion between the handle aperture and the body back edge and a circular leash portion between the handle aperture and the body front edge;

a crank housing coupled to the leash body, the crank housing having an inner face coupled to the body right side, a sidewall extending away from the inner face, the sidewall having a curved rim, and an outer face having an outer lip rotatingly coupled within the curved rim and defining a crank cavity, the crank housing being circular, a diameter of the crank housing being greater than a diameter of the leash portion;

a leash spool coupled to the leash body, the leash spool being coupled within the body inside of the leash portion, the leash spool having a center axle, a coil spring coupled around the center axle, and a spool body coupled to the coil spring, the center axle extending through the body right side and the inner face into the crank cavity;

a leash coupled to the leash spool, the leash being windingly coupled around the spool body with a distal end extending through a leash aperture of the body top edge, the leash having a clasp coupled to the distal end;

a leash lock coupled to the leash body, the leash lock being coupled through the body top edge proximal the body back edge, the leash lock being in operational communication with the leash to prevent and alternatively allow retraction through the leash aperture, the leash lock comprising a leash lock housing coupled to the leash body within the body inside, a spring-loaded lock button extending through the body top edge and having a leash pin extending through the leash lock housing, a leash catch coupled to the leash body within the body inside and arranged such that the leash passes between the leash pin and the leash catch, the leash catch having a depression to selectively receive the leash pin to cinch the leash against the leash catch, a retainer button coupled adjacent the lock button and having a retainer pin extending at an angle within the leash lock housing to selectively engage the leash pin, the retainer pin locking and alternatively releasing the retainer pin;

a guide pin coupled to the leash body, the guide pin being coupled within the body inside adjacent the leash catch;

a drive mechanism coupled to the crank housing, the drive mechanism being coupled to the outer face within the crank cavity, the drive mechanism comprising a central hub coupled to the outer face within the crank cavity, a drive gear coupled to the central hub, and a driven gear coupled to the center axle, the driven gear being in operational communication with the drive gear;

a crank handle coupled to the crank housing, the crank handle being coupled to the outer face to provide a place for a user to rotate the outer face to power the drive mechanism, rotate the center axle, and retract the leash, the crank handle having a pivot portion and a handle portion, the pivot portion extending perpendicularly from the outer face of the crank housing and the handle portion being pivotably coupled to the pivot portion to move between an extended position perpendicular to the outer face and an alternative folded position adjacent the outer face, the handle portion having a tongue pivotably coupled to the pivot portion and a rotatable grip coupled to the tongue, the tongue having a crank handle lock button to selectively engage and disengage the pivot portion; and a gear lock coupled to the crank housing, the gear lock comprising a spring-loaded gear release button extending through the sidewall to the crank cavity, the gear release button having a gear pin, the gear pin being selectively engageable with a spring-loaded lock paddle, the lock paddle having a paddle hub and a curved paddle arm extending from the paddle hub, the paddle arm being in operational communication with the drive gear to selectively allow movement in only one direction, the gear release button engaging and alternatively disengaging the lock paddle with the drive gear.

* * * * *